UNITED STATES PATENT OFFICE.

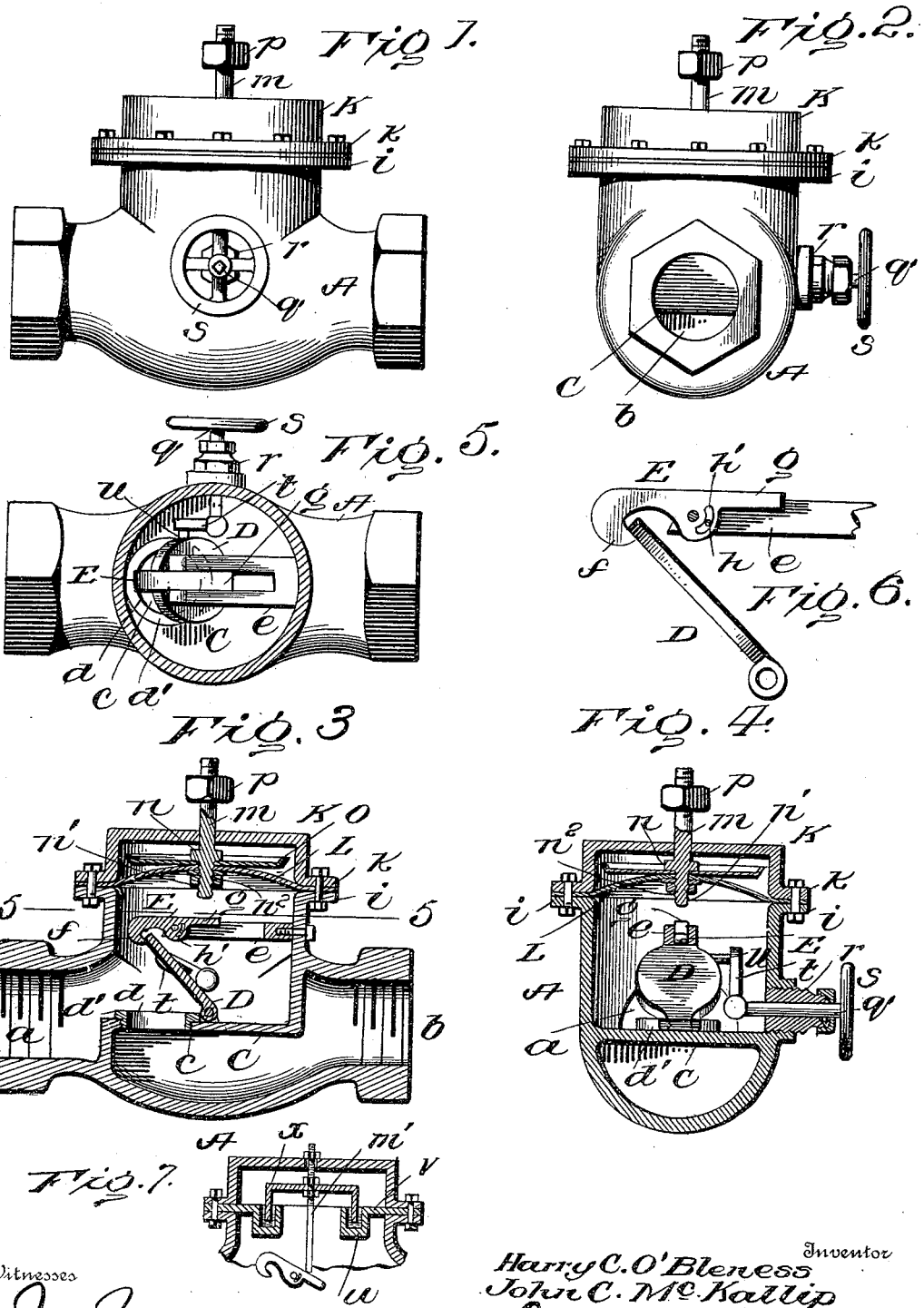

HARRY C. O'BLENESS AND JOHN C. McKALLIP, OF ATHENS, OHIO.

AUTOMATIC GAS CUT-OFF.

SPECIFICATION forming part of Letters Patent No. 642,998, dated February 6, 1900.

Application filed June 20, 1899. Serial No. 721,241. (No model.)

*To all whom it may concern:*

Be it known that we, HARRY C. O'BLENESS and JOHN C. McKALLIP, citizens of the United States, residing at Athens, in the county of Athens and State of Ohio, have invented certain new and useful Improvements in Automatic Gas Cut-Offs; and we do hereby declare the following to be a full, clear, and exact description of the invention, such as will enable others skilled in the art to which it appertains to make and use the same.

This invention relates to improvements in automatic gas cut-offs, and has for its object, primarily, to provide a simple, effective, and reliable valve device for use in house-service pipes and adapted to close automatically when the flow of gas is cut off or materially reduced by reason of breakage or leakage in the mains and remain closed until manually opened, so as to prevent the inlet of gas through open burners into the rooms or apartments of the house when the flow of the gas from the mains into the service-pipes is arrested, and thereby obviate all liability of explosions and danger of asphyxiation of the occupants of the house.

A further object of the invention is to provide means whereby the valve may be opened or closed from the exterior to let on or cut off the flow of gas and so construct the parts that the flow of gas when once cut off by the reduction of pressure in the main can only be restored by a manual manipulation of the valve.

With these and other minor objects in view the invention consists of certain novel features of construction, combination, and arrangement of parts, which will be hereinafter more fully described, and particularly pointed out in the appended claims, reference being had to the accompanying drawings, forming a part of this specification, and in which—

Figure 1 is a side elevation of an automatic gas cut-off constructed in accordance with our invention. Fig. 2 is an end elevation of the same. Fig. 3 is a vertical longitudinal section showing the normal position of the parts when the gas is passing through the service-pipe. Fig. 4 is a cross-section illustrating the manner in which the valve is manually opened. Fig. 5 is a horizontal section through the valve-section on the line 5 5 of Fig. 3. Fig. 6 is a detail view of the gravity catch and valve. Fig. 7 is a detail sectional view showing a modification in the construction of the diaphragm.

Referring now more particularly to the drawings, wherein like reference letters and characters designate corresponding parts throughout the several views, A represents the casing of the automatic valve or cut-off, which is provided, as shown, with inlet and discharge passages or ends $a$ and $b$, internally threaded or otherwise adapted to receive the proximal ends of the house-service pipe at the point where said valve is applied. These passages are separated by a partition C, having an opening $c$, forming a port for the flow of the gas through the valve, and threaded into this opening is a ring $d$, having a flange $d'$ resting upon the upper face of said partition and forming a seat for a gravity-valve D, which is pivoted to said flange. The valve is adapted to be held open by a gravity-catch E, pivoted to an arm or support $e$, secured to the wall of the valve-chamber and provided at one end with a hook $f$, adapted to engage with the edge of the valve diametrically opposite its pivotal point to hold it off its seat. The hooked end of the catch is weighted or made heavier than its opposite end to normally drop by gravity, and from the said opposite end of the catch projects an arm $g$, which is adapted to be operated to retract the catch and release the valve automatically, as will be hereinafter described. The catch is maintained in its normal operative position and limited in its swinging movement by a suitable stop device, that employed in the present instance consisting of a pin $h$, projecting through a slot $h'$ in the body portion of the catch and adapted to abut against the end walls thereof to limit the movement of the catch in either direction.

The valve-casing is open at its upper end and provided with a circumferential flange $i$, to which is bolted or otherwise fastened a similar flange $k$, formed upon the base portion of a cap K. Between these flanges is clamped the edge of a flexible diaphragm L, composed of rubber or like material, formed with an opening for the passage of the lower end of a rod or stem $m$, which is preferably attached thereto as follows: The lower end of the stem is provided with a shoulder $n$ and a reduced threaded portion $n'$, which passes through the said opening in the diaphragm and has applied thereto a nut $n^2$ or a nut and washer adapted to bear against the under side of the diaphragm and clamp the same firmly against a reinforcing-plate $o$, which is, in turn, clamped between the upper surface of the diaphragm and the said shoulder $n$ of the stem. By this construction the opening of the diaphragm is reinforced and said diaphragm prevented from tearing or becoming injured by undue pressure or a forcible thrust upon the stem from above. A nut $p$, tapped onto the upper end of the stem, holds the same in position and prevents it from dropping down into the valve-chamber when the cap is removed for purposes of repair or for obtaining access to the valve-casing.

The operation of the parts thus far described is as follows: The flap-valve D is normally held opened by the hooked end of the catch $d$, and the arm $g$ upon the rear end of said catch is located immediately under the reduced lower end of the stem $m$. When the valve is thus held open, the pressure of the gas passing through the casing will force the flexible diaphragm upward and hold the said lower reduced end of the stem above the arm of the gravity-catch, and when the flow of the gas through the casing is arrested by reason of breakage or leakage in the mains the flexible diaphragm being no longer supported will drop down, thereby bringing the reduced end $n$ of the stem into engagement with the arm $g$ of the catch, so as to force the latter downwardly and disengage the hooked catch from the valve, which drops down upon its seat and closes the port C, so as to prevent any passage of gas into the service-pipe. By this means the flow of gas into the service-pipe will be arrested until the valve is again lifted off its seat and held open by the gravity-catch, so that the inlet of gas through open burners into the rooms or apartments of the house when the flow of gas from the main into the service-pipe is resumed will be prevented and all liability of explosion and danger of asphyxiating the occupants of the house entirely obviated, as the resumption of the flow of the gas will have no effect upon the opening of the valve. The valve is adapted to be opened from the exterior and engaged with the gravity-catch through the medium of a shaft or spindle $q$ passing through a stuffing-box $r$ in the side of the valve-casing and provided at its outer end with a hand-wheel or other suitable operating device $s$ and at its other end with an arm $t$. This arm $t$ projects at right angles to the stem and has a slot or recess, into which projects a lug or boss $u$, formed upon and projecting laterally from the edge of the valve D, so that by turning the hand-wheel in one direction the arm $t$ will raise the valve from off its seat and bring it into position to engage the hooked end of the gravity-catch E, which will drop down and hold the same elevated as soon as released by the elevation of the stem $m$ under the pressure of the gas upon the diaphragm.

By means of the construction and arrangement of parts just described the valve may be opened and closed at any time desired independent of the gas-pressure, as the stem may be forced down to release the gravity-catch when it is desired to shut off the flow of gas through the valve and may be opened in the manner stated when it is desired to let on the flow of gas through the medium of the hand-wheel and its connections.

In Fig. 7 a modified construction of diaphragm is shown, which may be substituted for the flexible diaphragm illustrated in the other figures. This comprises a head or partition V, clamped between the flanges of the casing and cap and having a central opening for the passage of the stem $m'$ and an annular chamber $w$ for the reception of a sealing medium, such as mercury. The stem is connected to and passes through the movable portion of the diaphragm, which consists of an inverted metallic cup or bell $x$, having its lower edge or end loosely fitted in the chamber $w$, so that it may have free up-and-down movement and operate to close the valve in the same manner as the flexible diaphragm shown in the remaining figures, the mercury acting as a seal to prevent the escape of gas around the bell into the cap, as will be readily understood.

It will be readily observed from the foregoing description, taken in connection with the drawings, that our invention provides an automatic gas cut-off which is simple of construction, capable of being made and sold at a comparatively low cost, and that is effective in operation and not liable to get out of order.

It will of course be understood that changes in the form, proportion, and minor details of construction may be made within the scope of the invention without departing from the spirit or sacrificing any of the advantages thereof.

Having thus described the invention, what is claimed as new is—

1. An automatic gas cut-off, comprising a casing having inlet and discharge ends separated by a partition provided with a port, a pivoted valve controlling said port, a catch adapted to directly or positively engage the valve to hold it open, a pressure-operated device for retracting said catch, and a rotary or oscillatory member having a part to engage and swing the valve open on its pivot and into engagement with the catch.

2. An automatic gas cut-off, comprising a casing having a partition separating its inlet and outlet ends and a diaphragm-chamber above said partition, a valve controlling a port in said partition, a supporting-arm, a pivoted catch having a slot and stop connection with said arm to limit its movement and adapted to directly engage the valve to hold it open, and a diaphragm having a stem to abut against the catch for retracting it and releasing the valve.

3. An automatic gas cut-off, comprising a casing having inlet and outlet ends separated by a partition provided with a port, a cap closing the upper end of the casing and forming therewith a diaphragm-chamber located wholly above said partition, a single, automatically-closing valve controlling said port, a catch for engaging the valve to hold it open, a diaphragm located in said diaphragm-chamber and adapted to retract the catch, a stem carried by the diaphragm and projecting through the cap, and means for opening the valve and moving it into engagement with said catch.

4. An automatic gas cut-off, comprising a casing having inlet and outlet ends separated by a partition provided with a port, a cap closing the top of the casing and forming therewith a diaphragm-chamber located wholly above said partition, an arm projecting from the casing above the valve-seat, a pivoted, gravity-closing valve controlling the port, a gravity-catch pivoted to said arm and adapted to directly engage and hold the valve open, and a diaphragm in the diaphragm-chamber, a stem projecting exteriorly through the cap and attached to the diaphragm and adapted when the latter is depressed by a reduction of the gas-pressure to retract said catch, and a rotary or oscillatory shaft or stem projecting through the body of the casing and adapted to be turned to unseat the valve and move into engagement with the catch.

5. An automatic gas cut-off, comprising a casing having a gravity-valve for controlling the flow of gas therethrough, a gravity-catch to engage the valve and hold it open, a movable diaphragm, an exteriorly-projecting stem carried by the diaphragm and adapted to retract said catch and release the valve, and means for opening the valve and moving it into engagement with said catch.

6. An automatic gas cut-off, comprising a casing, a valve therein provided with a lug or boss, a catch to hold the valve open, a pressure-controlled device for retracting said catch to allow the valve to close, and a revoluble shaft or spindle projecting through the wall of the casing and provided at its inner end with an arm to engage the lug or boss on the valve and at its outer end with an operating device whereby it may be turned to unseat the valve and move it into engagement with said catch.

In testimony whereof we affix our signatures in presence of two witnesses.

HARRY C. O'BLENESS. [L. S.]
JOHN C. McKALLIP. [L. S.]

Witnesses:
JAMES F. BROWN,
BELLE R. LAWRENCE.